United States Patent
Impola et al.

(10) Patent No.: US 11,768,289 B2
(45) Date of Patent: Sep. 26, 2023

(54) WORK MACHINE WITH LIDAR HAVING REDUCED FALSE OBJECT DETECTION

(71) Applicant: Caterpillar Paving Products Inc., Brooklyn Park, MN (US)

(72) Inventors: Todd A. Impola, Minnetonka, MN (US); Siddarth Desikan, Sewickley, PA (US); Nathaniel Doy, Maple Grove, MN (US); Lawrence A. Mianzo, Pittsburgh, PA (US); Mark E. Hartman, Edwards, IL (US); Shanmukha Bhumireddy, Pittsburgh, PA (US); Sri Sekharan, Kumbakonam (IN)

(73) Assignee: Caterpillar Paving Products Inc., Peoria, IL (US)

( * ) Notice: Subject to any disclaimer, the term of this patent is extended or adjusted under 35 U.S.C. 154(b) by 242 days.

(21) Appl. No.: 17/328,704

(22) Filed: May 24, 2021

(65) Prior Publication Data
US 2022/0373680 A1 Nov. 24, 2022

(51) Int. Cl.
| | |
|---|---|
| G01S 17/04 | (2020.01) |
| G01S 17/931 | (2020.01) |
| G01S 15/931 | (2020.01) |
| G01S 13/931 | (2020.01) |
| G01S 15/04 | (2006.01) |
| G01S 13/04 | (2006.01) |

(52) U.S. Cl.
CPC ............. *G01S 17/04* (2020.01); *G01S 13/04* (2013.01); *G01S 13/931* (2013.01); *G01S 15/04* (2013.01); *G01S 15/931* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 10,613,218 B2 | 4/2020 | Ichinose et al. | |
| 2005/0195488 A1* | 9/2005 | McCabe | G02B 5/085 |
| | | | 359/603 |

(Continued)

FOREIGN PATENT DOCUMENTS

| | | |
|---|---|---|
| CN | 108107418 A | 6/2018 |
| CN | 110716191 A | 1/2020 |

(Continued)

OTHER PUBLICATIONS

"LiDAR Mount"—edge-rit.edu/edge/P16241/public/Detailed Design Documents/LIDAR Mount.png.

*Primary Examiner* — Hovhannes Baghdasaryan (57) ABSTRACT

A work machine, light detection and ranging (LiDAR) system, and method of reducing false object detections are disclosed. The work machine may include a frame, a power unit, a locomotive device, and the LiDAR system. The LiDAR system may include at least one laser, at least one sensor, a bracket, and a control unit configured to execute an object detection program. The LiDAR system is configured to exclude from its object detection program a plurality of beams emitted toward the work machine through a design of the bracket and/or software methods of the control unit. The method may include storing a database of exclude coordinates and using the database to filter out undesirable data samples from the object detection program.

19 Claims, 8 Drawing Sheets

(56) References Cited

U.S. PATENT DOCUMENTS

| | | | |
|---|---|---|---|
| 2011/0282581 A1* | 11/2011 | Zeng | G01S 17/89 |
| | | | 701/301 |
| 2014/0266859 A1 | 9/2014 | Kurihara | |
| 2015/0009485 A1* | 1/2015 | Mheen | G01S 7/4817 |
| | | | 356/4.01 |
| 2017/0363738 A1* | 12/2017 | Kaino | G01S 13/584 |
| 2018/0284233 A1* | 10/2018 | Nichols | G01S 7/4813 |
| 2019/0003895 A1* | 1/2019 | Krishnan | B60R 11/04 |
| 2020/0134396 A1* | 4/2020 | Porta | G05D 1/0257 |

FOREIGN PATENT DOCUMENTS

| | | |
|---|---|---|
| KR | 20210011259 A | 2/2021 |
| WO | 2020180707 A1 | 9/2020 |

* cited by examiner

WORK MACHINE WITH LIDAR HAVING REDUCED FALSE OBJECT DETECTION

TECHNICAL FIELD

The present disclosure generally relates to depth mapping methodologies and, more specifically, to light detection and ranging (LiDAR) technology employed in conjunction with work machines.

BACKGROUND

Light detection and ranging technology, often referred to as LiDAR, is a depth mapping methodology employed in a number of applications, including terrain modeling, vehicle object detection, agricultural analysis, and more. A LiDAR system typically operates by emitting a plurality of laser beams across a field of view (FOV), followed by the measurement of a time of flight (ToF) for each emitted beam to reflect off an opposing surface (or fail to reflect) and return to the LiDAR sensor. The LiDAR may use the ToFs and the speed of light to calculate a distance travelled by each beam and derive spatial data regarding its surroundings. For example, the resulting ToF data may be used to generate a depth map—an image showing a distance travelled from a viewpoint (the LiDAR) to each coordinate within the FOV, and/or the data may be used to generate a point cloud—a collection of points representing a 3D shape or feature.

The depth map or point cloud generated by a LiDAR may be employed in an object detection program of an autonomous or semiautonomous vehicle. For example, LiDAR technology may be installed on a work machine, such as one used in agricultural, construction, or earth moving applications, to detect local terrain and avoid potential hazards and obstructions. However, existing LiDAR systems implemented onto work machines may unintentionally interact with the body of the associated machine, especially if the machine comprises reflective surfaces. In particular, a laser beam encountering a reflective surface, such as a glass window of a cabin or a mirror, may strike the reflective surface and deflect from its original trajectory. The deflected beam may then reflect off an object and return to the LiDAR sensor. In this scenario, the LiDAR may wrongly interpret the object to lie on the original trajectory of the beam rather than the deflected trajectory, thereby creating a false object reading. In a related scenario, a second laser beam may be aimed directly at the object, reflect off the object, and return to the LiDAR sensor with a true object reading. If both occur, the LiDAR may interpret a single object twice at two separate locations, wherein only one is the true object and one is a false object. Accordingly, a solution is desired to reduce the possibility of false object detections by a LiDAR system, especially those false positives which originate from reflective surfaces on the work machine itself.

The state of the art has failed to provide a reliable, targeted, and cost-effective solution in this regard. One example of prior art may be found in U.S. Publication No. 2020/0309923A1, invented by Bhaskaran et al. and assigned to Panosense Inc. Bhaskaran discloses a technique for identifying LiDAR false positives by feeding LiDAR sensor data and environmental sensor data through a machine learning model. Information relating to the LiDAR laser and sensor, such as laser transmission power, reflected pulse power, and reflected pulse width; information relating to the vehicle, such as speed, acceleration, and gyroscopic data; information relating to the environment, such as bariatric pressure and thermal data; and other factors may be considered in the algorithm. However, Bhaskaran is primarily focused on recognizing and, more importantly, ignoring "false positives" associated with particulate matter, e.g. smoke, fog, exhaust, or rain. These particulates are in fact real objects, but would have little to no impact on a moving vehicle and may be disregarded. Bhaskaran does not provide guidance regarding false positives originating from the associated vehicle itself. Moreover, the disclosed solution of Bhaskaran requires extensive resources, including a system of sensors, ample computing power, and existing training data, all of which may increase the cost of implementation and the number of failure modes. Accordingly, there remains a need in the art a solution for reducing false object detections by a LiDAR system associated with a vehicle or work machine.

SUMMARY OF THE DISCLOSURE

According to a first aspect of the present disclosure, a work machine is disclosed. The work machine comprises a frame; a power unit supported by the frame; at least one locomotive device supporting the frame and driven by the power unit; and a LiDAR system configured to reduce false object detection. The LiDAR system includes at least one laser capable of emitting a plurality of laser beams across a field of view, each emitted beam corresponding to a beam coordinate within the field of view; at least one sensor capable of receiving a plurality of reflected beams, each reflected beam corresponding to an emitted beam; at least one bracket configured to house the at least one laser and the at least one sensor; and a control unit including a machine-readable storage medium and a processing unit, the control unit being configured to execute an object detection program. The LiDAR excludes from the object detection program a plurality of beams emitted toward the work machine.

According to a second aspect of the present disclosure, a LiDAR system for use with a work machine and configured to reduce false object detection is disclosed. The LiDAR comprises at least one laser capable of emitting a plurality of laser beams across a field of view, each emitted beam corresponding to a beam coordinate within the field of view; at least one sensor capable of receiving a plurality of reflected beams, each reflected beam corresponding to an emitted beam; and a control unit including a machine-readable storage medium and a processing unit, the control unit being configured to run a computer implemented method of reducing false object detection. The method includes: storing a database of excluded coordinates, each excluded coordinate being with respect to the field of view; emitting the plurality of laser beams; receiving the plurality of reflected beams; filtering a plurality of data samples, each sample corresponding to a beam coordinate, such that, if the database includes the beam coordinate, excluding a data sample corresponding to the beam coordinate, and if the database does not include the beam coordinate, including a data sample corresponding to the beam coordinate; and executing an object detection program using only the included data samples.

According to a third aspect of the present disclosure, a method of reducing false object detection by an object detection system on a work machine is disclosed. The method comprises: storing a database of excluded coordinates, each excluded coordinate being with respect to a field of view; emitting a plurality of wave-propagated beams across the field of view, each emitted beam corresponding to a beam coordinate within the field of view; receiving a plurality of reflected beams, each reflected beam corresponding to an emitted beam; filtering a plurality of data samples, each data sample corresponding to a beam coordinate, such that, if the database includes the beam coordinate, excluding a data sample corresponding to the beam coordinate, and if the database does not include the beam coordinate, including a data sample corresponding to the beam coordinate; and executing an object detection program using only the included data samples.

These and other aspects and features of the present disclosure will be more readily understood after reading the following description in conjunction with the accompanying drawings.

DETAILED DESCRIPTION

Figure 1:
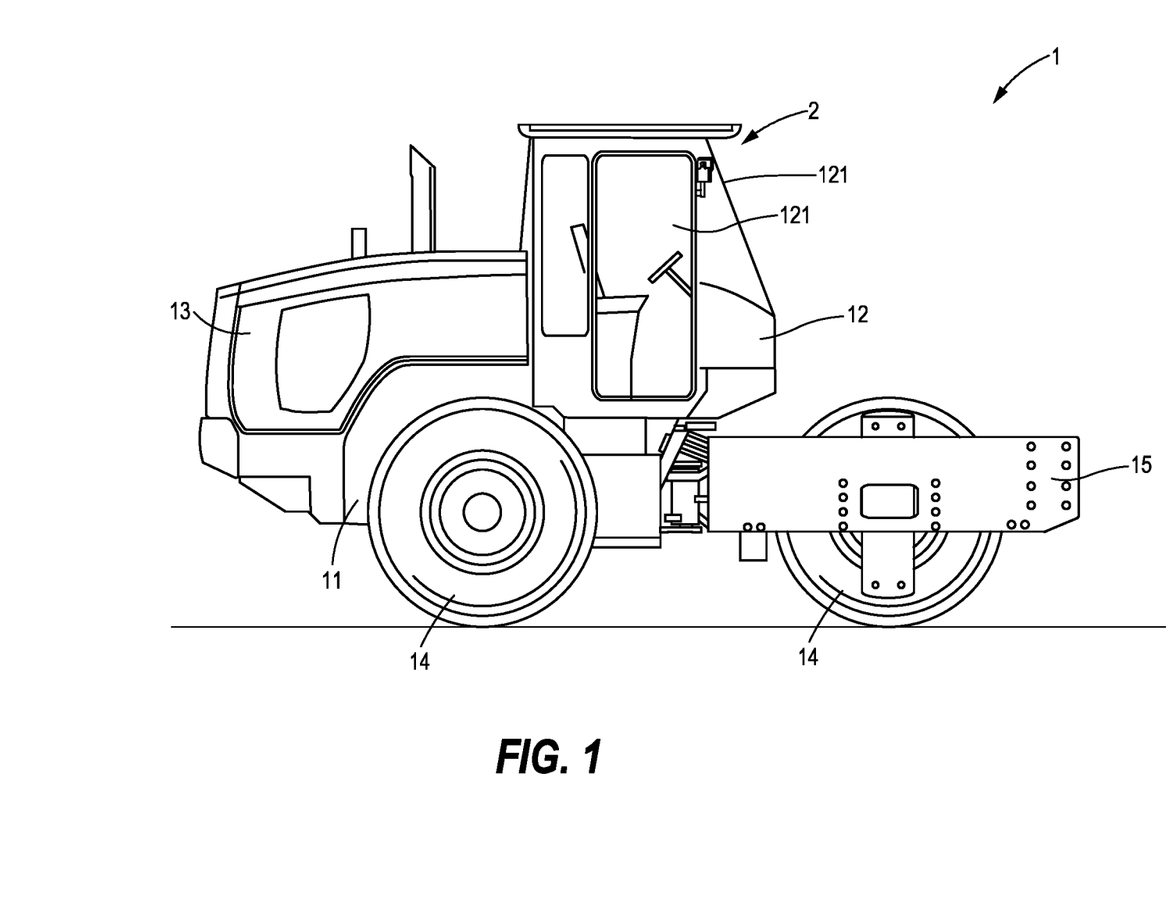
FIG. 1 is a perspective view of a work machine and LiDAR system according to one embodiment of the present disclosure.

Referring now to the drawings and with specific reference to FIG. 1, a perspective view of a work machine constructed in accordance with the present disclosure is generally referred to by a reference numeral 1. The work machine 1 is depicted as a vibratory soil compactor, but may alternatively be any work machine designed for construction, agricultural, mining, or earth moving applications, such as but not limited to an asphalt compactor, skid steer, excavator, track loader, tractor, backhoe, and the like. The work machine may include a frame 11, a cabin 12 supported by the frame 11, an engine or power unit 13 supported by the frame 11, and a locomotive device 14 supporting the frame 11 and being operatively driven by the power unit 13. The locomotive device 14 may feature the wheels and tires as shown, or may engage the ground in a separate fashion, such as by employing crawler belts, tracks, treads, or the like, in order to propel the work machine 1.

The work machine 1 may also include an implement 15 operatively attached to the frame 11. As seen in the exemplary soil compactor shown in FIG. 1, the implement 15 may be a vibratory roller configured to create compaction through centrifugal force. In other examples, the work machine 1 may instead be a soil compactor with tandem tamping rollers, which may act as both the implement 15 and as the locomotive device 14. And in yet other embodiments, the work machine 1 may be an asphalt compactor, a landfill compactor, a pneumatic compactor, a sheepsfoot compactor, a different type of compactor, or a different type of work machine 1 altogether, each comprising an implement or implements 15 congruent with their equivalents in the art. For example, the implement 15 may, in various embodiments, manifest as an auger, bucket, boom, lift arm, hammer, etc. It should be understood that no limitation is intended for the type of work machine 1 and that the innovative features disclosed herein may be applied to a number of different work machines 1 to similar effect.

In some embodiments, the work machine 1 may comprise a cabin 12 housing a number of controls for driving the work machine 1 and for controlling its implements 15. The work machine may further include one or more reflective surfaces 121, such as glass windows on the cabin 12 designed to provide visibility to a human (or machine) operator. The work machine 1 may also comprise additional reflective surfaces 121, such as but not limited to side mirrors, headlight assemblies, metallic surfaces, and yet other components with significant reflection coefficients. In various embodiments, the work machine 1 may be fully autonomous or semi-autonomous, and it may require limited operator input, a remote operator, or no operator whatsoever. However, it is worth noting that a cabin 12 may or may not be installed on the work machine 1 regardless of its level of autonomy in order to enable flexible operating conditions.

Figure 2:
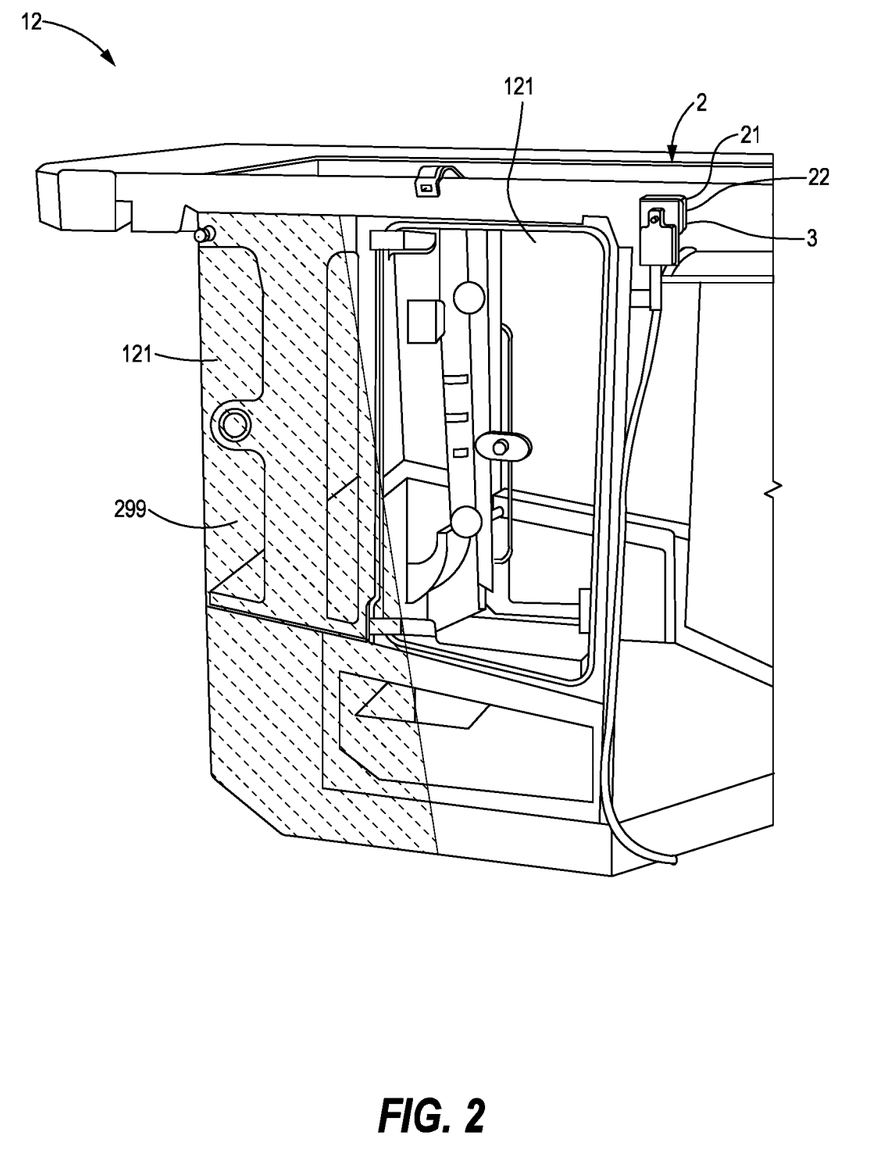
FIG. 2 is a perspective view of a cabin of the work machine and LiDAR system according to the state of the art.

Turning now to FIG. 2, the work machine 1 may comprise a LiDAR system 2. The LiDAR system 2 may be operatively installed on the cabin 12 as depicted, or it may be installed on another component of the work machine 1, for example the frame 11. The LiDAR system 2 may include at least one laser 21 and at least one sensor 22, both housed in a bracket 3 affixed to the cabin 12. The LiDAR system 2 may further comprise a control unit 4 (not shown), including a machine-readable storage medium and a processing unit, configured to acquire data samples from the laser 21 and the sensor 22 and to execute an object detection program.

The laser 21 may be capable of emitting a plurality of laser beams across a field of view (FOV), where each emitted beam corresponds to a beam coordinate within the FOV. Likewise, the sensor 22 may be capable of detecting a plurality of reflected beams, each reflected beam corresponding to an emitted beam and the same beam coordinate. No limitation is intended herein for the type of LiDAR technology employed by the LiDAR system 2, which may include but not be limited to flash LiDAR, scanning LiDAR, airborne bathymetric or topological LiDAR, terrestrial LiDAR, and the like. Nor is any limitation intended for the specifications of the laser 21, such as its wavelength, power, pulse length, transmission frequency, etc., or the specifications of the sensor 22, which may be a CMOS detector, CCD detector, or another related optical sensor.

Figure 3:
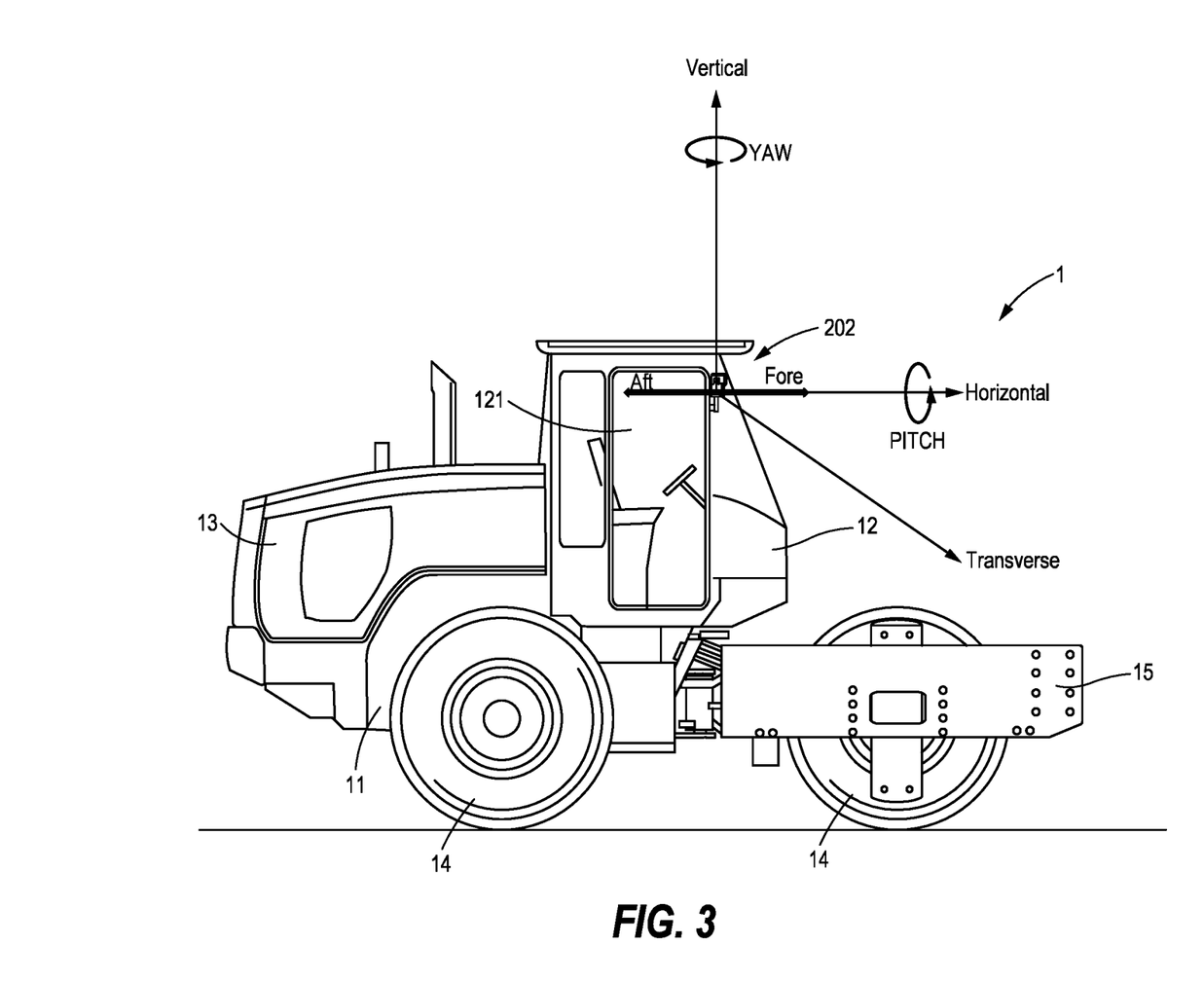
FIG. 3 is a perspective view of a work machine and LiDAR system according to an embodiment of the present disclosure with reference coordinate system.

Turning now to FIG. 3, the work machine may be fitted with two distinct sets of lasers 21 and sensors 22. Specifically, the work machine 1 may comprise a first, left-facing LiDAR 201 (not shown) centered on a transverse axis of the work machine; and a second, right-facing LiDAR 202 centered on the same transverse axis, but facing the opposite direction. By the term 'centered on the transverse axis,' it may be understood that a center of the LiDAR's FOV lies on or is parallel to a transverse axis of the work machine 1, i.e. perpendicular to a vertical axis and a horizontal axis of the work machine 1. However, it should further be understood that the axes and rotational directions shown in FIG. 3 are provided to help describe a position and/or movement in three-dimensional space only and that other coordinate schemes may be used without departing from the scope of the present disclosure.

Each beam coordinate may include a pitch value corresponding to a pitch angle of the FOV; and a yaw value corresponding to a yaw angle of the FOV. In an embodiment, each LiDAR 201, 202 may encompass 210° of yaw in its FOV. It may thus be calculated that a total scope of the left-facing and right-facing LiDARs 201, 202 fully encompasses 360° of vision around the work machine 1, with 30° of overlap in a sector in front and behind the work machine 1. While a 210° FOV is disclosed in the present embodiment, other FOVs are also possible and envisioned. Depending on the specific LiDAR system 2, the FOV may be larger or smaller in angle, may have a standard or irregular shape, and/or may be equal or unequal in scope along its different axes.

Returning now to FIG. 2, contact points 299 represent where a plurality of emitted laser beams may strike the work machine 1 during operation. In the configuration shown—which may be considered analogous to the state of the art—components of the work machine 1 may lie within the FOV of the LiDAR system 2, especially if the FOV is particularly broad. Consequently, emitted beams which strike reflective surfaces 121 of the work machine 1, such as the windows of the cabin 12, may be unintentionally deflected, potentially leading to inaccurate data samples and false object detections. Accordingly, the present application seeks to provide a LiDAR system 2 configured to exclude from its object detection program the plurality of beams emitted toward the work machine 1. A number of embodiments are presented to resolve the problem of false positives originating from the work machine 1. Each solution is described in detail below and may be enabled independently or in combination with another.

Figure 5:
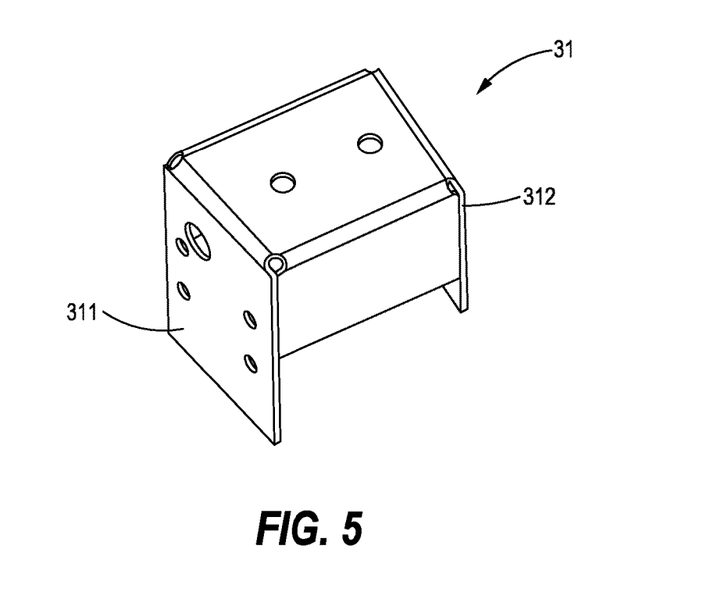
FIG. 5 is a perspective view of an angled bracket configured to house components of the LiDAR system according to an embodiment of the present disclosure

According to a solution shown in FIG. 5, an angled bracket 31 is disclosed, the angled bracket 31 being configured to house the at least one laser 21 and the at least one sensor 22 (not shown). As best seen in FIG. 5, the angled bracket 31 may include a front plate 311 with an opening configured to allow the emission and receipt of emitted and reflected beams respectively. The angled bracket 31 may further feature a back plate 312 aligned divergent or non-parallel to the front plate 311. After installation, the back plate 312 may be substantially perpendicular to the transverse axis of the work machine 1, while the LiDAR FOV may be centered substantially perpendicular to the front plate 311. The angled bracket 31 thus orients the LiDAR FOV to be centered oblique of the transverse axis to a degree equal to the angle formed by the front plate 311 and the back plate 312. In an embodiment, the angled bracket 31 is configured to orient the FOV of both the left-facing LiDAR 201 and the right-facing LiDAR 202 7.5° fore of the transverse axis of the work machine 1.

Figure 4:
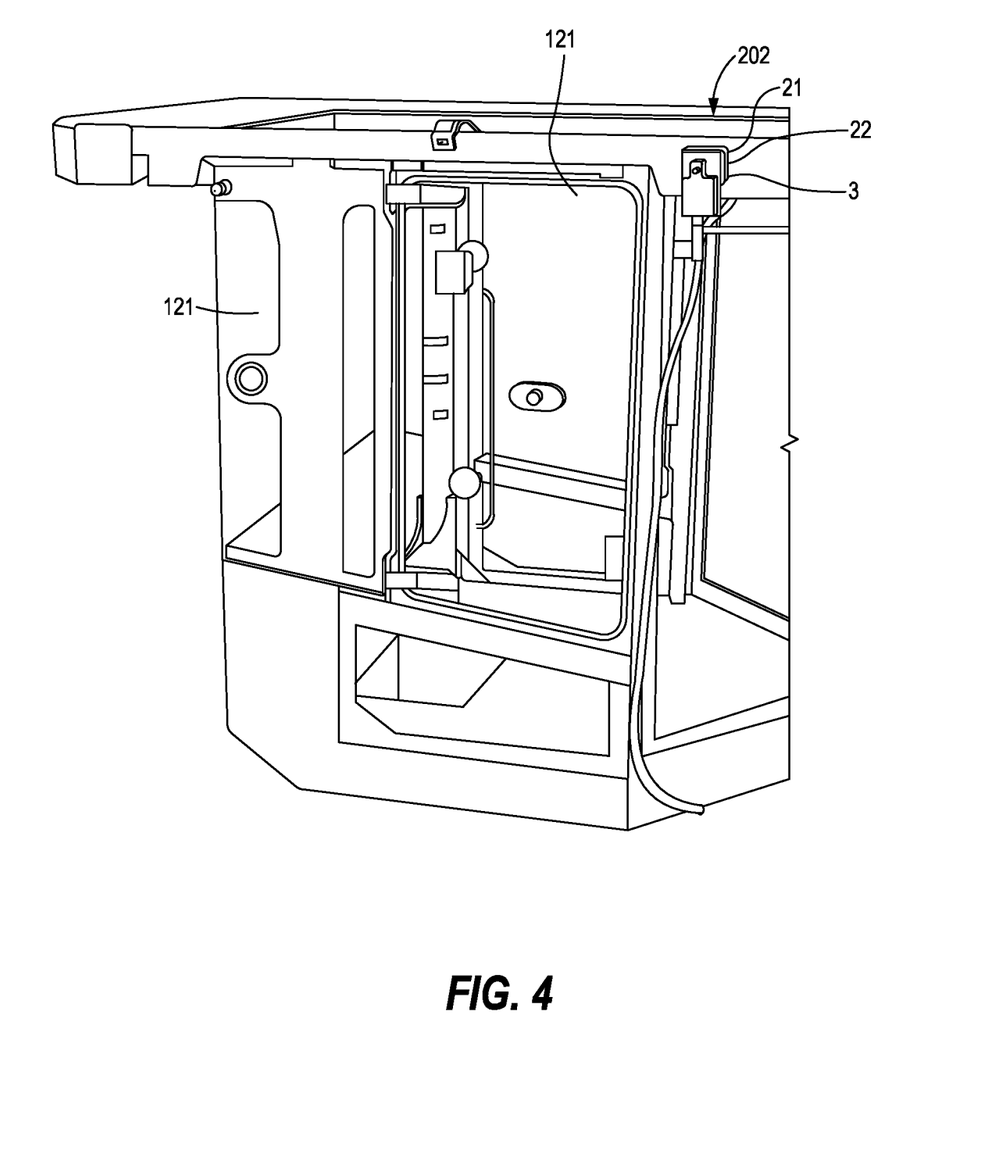
FIG. 4 is a perspective view of a work machine cabin and LiDAR system configured to reduce false object detection according to an embodiment of the present disclosure.

Turning now to FIG. 4, the angled bracket 31 may shift the FOV of both the left-facing LiDAR 201 and the right-facing LiDAR 202 several degrees fore of the transverse axis, such that no emitted beams or a reduced number of emitted beams strike the work machine 1. In contrast to FIG. 2, wherein a LiDAR system 2 installed on a work machine 1 according to the state of the art may exhibit a number of contact points 299, the LiDAR system 2 installed on the angled bracket 31 in FIG. 4 may reduce or fully eliminate this number. While only the right-facing LiDAR 202 is shown, an analogous angled bracket 31 may be installed and the same shift in FOV performed symmetrically with regard to the left-facing LiDAR 201. For example, the angled bracket 31 for the left-facing LiDAR 201 may be a mirrored form of the angled bracket 31 for the right-facing LiDAR 202. In other embodiments, an angled bracket 31 shifting the FOV in another direction, such as aft, up, down, or a combination thereof is also possible and envisioned. Various reorientations may be achieved by simply altering the geometry of the angled bracket 31 and/or its placement relative to the work machine 1. In an embodiment where components of the work machine 1 are asymmetric, the angled bracket 31 for the left-facing LiDAR 201 and the right-facing LiDAR 202 may have different geometries and may be tailored to match the desired reorientation based on specific applicational requirements.

Figure 6:
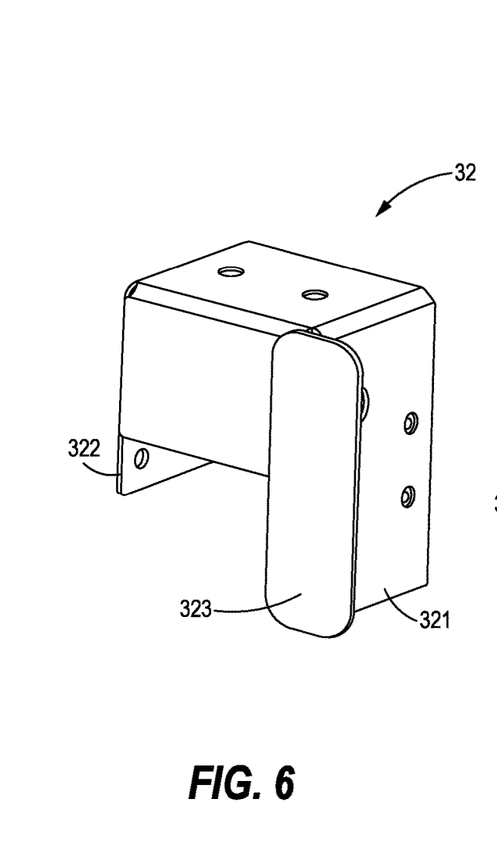
FIG. 6 is a left perspective view of a blinder bracket configured to house components of the LiDAR system according to an embodiment of the present disclosure.
Figure 7:
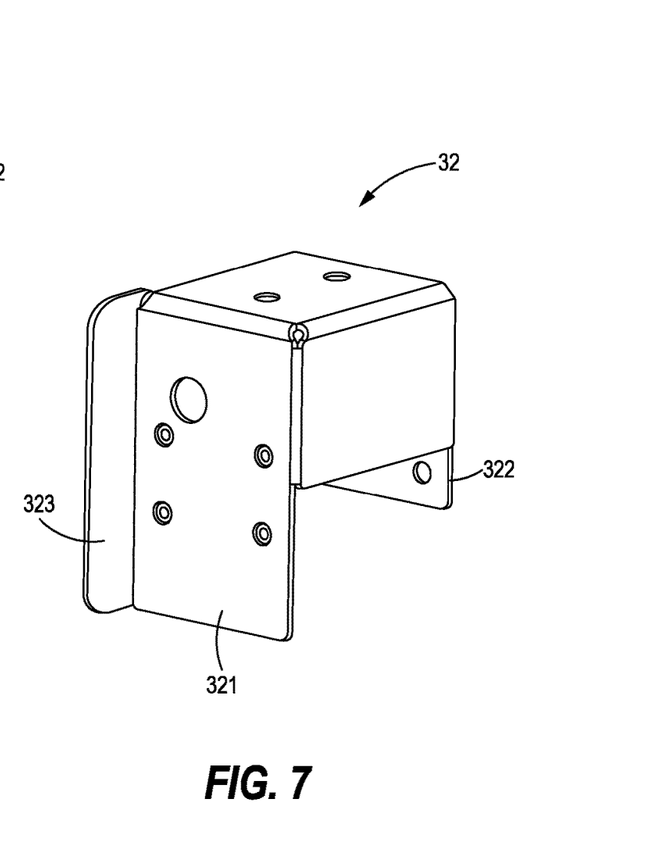
FIG. 7 is a right perspective view of the blinder bracket shown in FIG. 6.

According to a second solution shown in FIGS. 6 and 7, a blinder bracket 32 is disclosed, the blinder bracket 32 being configured to house the at least one laser 21 and the at least one sensor 22 (not shown). The blinder bracket 32 may include a front plate 321 with an opening configured to allow the emission and receipt of emitted and reflected beams respectively. The blinder bracket may further feature a back plate 322 aligned parallel to the front plate 321. After installation, the back plate 322 may be substantially perpendicular to the transverse axis of the work machine 1, while the LiDAR FOV may be centered substantially perpendicular to the front plate 321. In other words, the blinder bracket 32 does not substantially shift the FOV of the LiDAR system 2 away from the transverse axis of the work machine 1.

The blinder bracket 32 may further include a blinder 323 substantially perpendicular to the front plate 321 and configured to obstruct a plurality of laser beams emitted toward the work machine 1. In the embodiment shown, the blinder 323 may be installed aft of the front plate 321, and may accordingly obstruct a range of beam coordinates within the FOV most aft of the transverse axis. In other embodiments, the blinder 323 may instead be installed on the fore side of the front plate 321, and may accordingly obstruct a range of beam coordinates most fore of the transverse axis. It should be observed that a width of the blinder 323 corresponds geometrically to the range of obstruction, which may correspond to a range of yaw values in the example shown. It should also be understood that the blinder 323 may be installed in different configurations so as to obstruct a plurality of beams corresponding to other, different ranges of beam coordinates. In various embodiments, the blinder 323 may manifest different placements relative to the front plate 321, different angles of attachment with respect to the front plate 321, and different blinder shapes and geometries. No limitation is intended herein for the shape or number of blinders 323 attached to the blinder bracket 32 nor the ranges of coordinates intended for obstruction.

In one embodiment, the blinder 323 may removably attached to an ordinary bracket 3, and may be switched out depending on the specific requirements of the associated work machine 1. In another embodiment, wherein components of the work machine 1 are asymmetric, the blinder bracket 32, and particularly the blinder 323, for the left-facing LiDAR 201 and the right-facing LiDAR 202 may have different configurations and may be tailored to match the desired obstruction.

Figure 8:
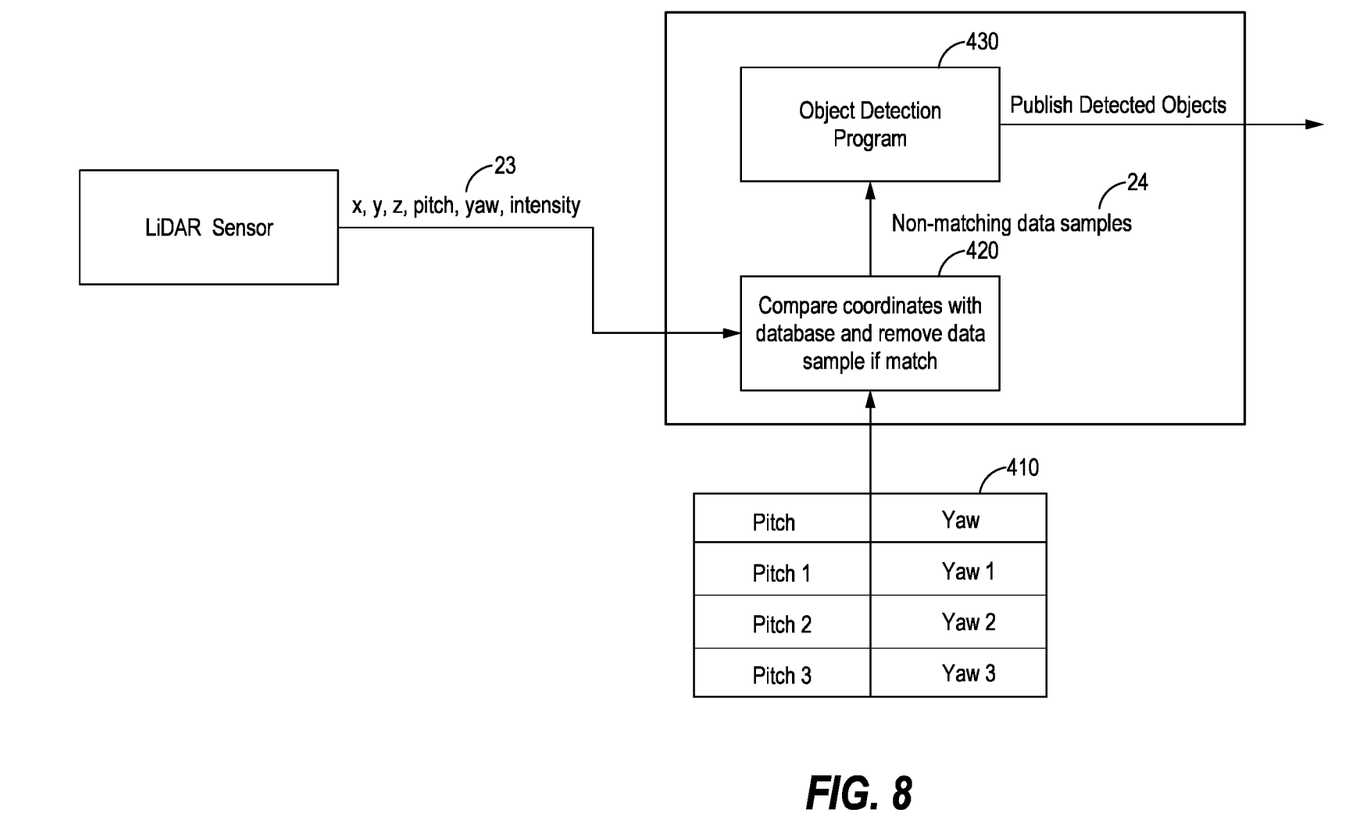
FIG. 8 is a schematic of a LiDAR system method for reducing false object detection according to an embodiment of the present disclosure.

According to a third solution of the present disclosure, the control unit 4 may run a computer implemented method of reducing false object detection. As depicted in FIG. 8, the control unit 4 may be configured to filter a plurality of data samples 23 prior to executing an object detection program 430. Each data sample 23 may correspond to a beam coordinate and, in some embodiments, a ToF associated with a laser beam emitted and received at that beam coordinate. In other embodiments the data sample 23 may correspond to another signal or data type indicative of the depth traveled by the corresponding beam, such as but not limited to the intensity of an electrical signal correlated with the ToF.

The control unit 4 may store in the machine-readable storage medium a database 410 of excluded coordinates, each coordinate being with respect to the FOV. Each excluded coordinate may adhere to the same coordinate system as that of the beam coordinate, and may include at least a pitch value and a yaw value. In an embodiment, the excluded coordinates in the database 410 may correspond to a range of beam coordinates known to strike the work machine 1, and particularly a range of beam coordinates known to strike a reflective surface of the work machine 1. In other embodiments, the excluded coordinates may correspond to a different range of beam coordinates intended for exclusion from the object detection program.

During real-time operation of the LiDAR system 2, the beam coordinate of each data sample 23 is compared with the excluded coordinates stored in the database 410 through a filtering program 420. Data samples with matching coordinates, i.e. matching yaw values and pitch values, may be excluded from the subsequent object detection program 430. Consequently, the control unit 4 may execute the object detection program 430 using only the non-matching data samples 24 corresponding to, for example, only those coordinates known to not strike the work machine 1.

In some embodiments, the database 410 may instead comprise a list of allowed coordinates, wherein the above filtering logic may be reversed. In this case, only data samples 23 matching the coordinates of the database 410 may be included (and non-matching data samples 24 excluded) in the subsequent object detection program 430.

In various embodiments, the control unit 4 may be a computer, microcontroller, application-specific integrated circuit, field-programmable gate array, or similar computing device. The control unit 4 may further be internal to the LiDAR, internal to the work machine 1, or an external control unit 4 operatively communicating with the components of the LiDAR system 2 and the work machine 1. Where the work machine 1 comprises a left-facing LiDAR 201 and a right-facing LiDAR 202, each LiDAR 201, 202 may include its own control unit 4 or may share the same control unit 4. Likewise, a separate database 410 may be stored and/or a separate filtering program 420 executed by separate control units 4 in operative communication or by the same control unit 4. No limitation is intended for the data structure of the database 410, which may be a lookup table, data table, array, etc. While the yaw values and the pitch values are disclosed as the primary entries in the database 410 and the factors employed in the filtering program 420, additional factors may also be stored and utilized during filtration without departing from the scope of the present disclosure.

Figure 9:
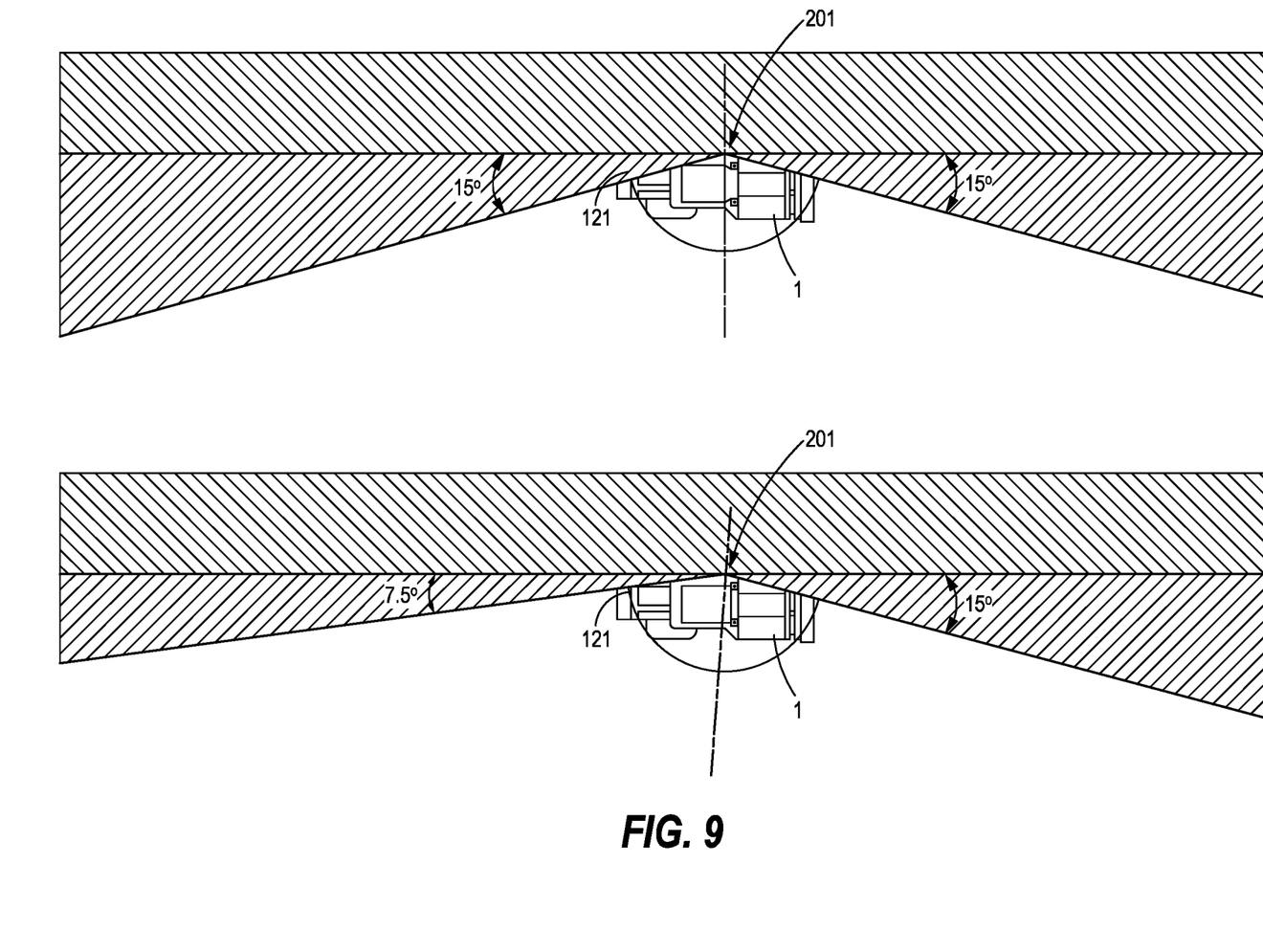
FIG. 9 is an illustration comparing a field of view of the LiDAR system according to two different embodiments of the present disclosure.

Turning now to FIG. 9, a diagram of a FOV of the LiDAR system 2 used in the object detection program 430 with and without the filtering program 420 is shown. In the top example, a LiDAR system 2 congruent with the state of the art has a FOV including a full 210° of yaw. Thus, data samples from the entire FOV are considered in the work machine's 1 object detection program 430. However, components of the work machine 1, and, especially, reflective surfaces 121, may overlap with the FOV.

In the bottom figure, the control unit 4 filters out a range of yaw values to reduce the FOV by 7.5° of yaw, and specifically filters the range of beam coordinates most aft of the transverse axis. The data samples 23 from this range of beam coordinates, which may correspond to the reflective surfaces 121 of the work machine 1, are excluded from the object detection program 430, potentially reducing false positives stemming therefrom.

While only the left-facing LiDAR 201 is depicted in FIG. 9, it should be understood that a mirrored FOV and an analogous effect may be applied to the right-facing LiDAR 202. Furthermore, where surfaces of the work machine 1 are asymmetric, the database 410 may include separate entries for the left-facing LiDAR 201 and for the right-facing LiDAR 202. The entries for each LiDAR 201, 202 may be populated with the beam coordinates known to project onto that specific half of the work machine 1. Lastly, while a range of 7.5° in yaw values is filtered in the present embodiment, it should be understood that the control unit 4 may be configured to include in its database 410 any predetermined range of excluded coordinates. In some embodiments, the database 410 may include a range of yaw values, a range of pitch values, or a list of exact coordinates for exclusion.

It should be understood that the LiDAR system 2 may be mounted on any component or any location with respect to the work machine 1 and that any number of LiDAR systems 2 may be utilized in the object detection program 430, including but not limited to the left-facing LiDAR 201 and the right-facing LiDAR 202. Each LiDAR 2 may be oriented using the angled bracket 31, obstructed using the blinder bracket 32, and/or filtered through the filtering program 420 in order to exclude a range of the LiDAR's FOV from the object detection program 430. In many embodiments, the excluded FOV may correspond to reflective surfaces 121 of the work machine 1, such as glass windows of the cabin 12 or mirrors. However, the excluded FOV may also correspond to other components or surfaces known to interfere with the object detection program 430, such as but not limited to transparent surfaces, refractive surfaces, diffractive surfaces, and the like. By following the designs disclosed herein, a LiDAR system 2 for a work machine 1 or vehicle may be configured to reduce false object detection through several solutions, wherein a plurality of laser beams emitted by the LiDAR system 2 toward the work machine 1 may be avoided, obstructed, and/or programmatically excluded from an object detection program 430.

INDUSTRIAL APPLICATION

The present application may find industrial applicability in any number of work machines and may be particularly useful toward those work machines employing autonomous or semi-autonomous operation and employing object detection programs. In particular, a work machine employing object detection through LiDAR technology may utilize any or all of the disclosed solutions to reduce false positives stemming from the work machine itself. By reducing the frequency of false object detection, the present disclosure can prevent unnecessary machine stoppages and increase operational efficiency. Where a human operator is involved, the disclosed solutions may improve the accuracy and reliability of driver-assistance information, reduce the frequency of warnings or alarms stemming from false positives, and increase overall operator safety. Furthermore, the reduction of false positives may improve the frequency of true positives, lending increased confidence to the object detection program, and further improving work machine safety and reliability. The solutions disclosed herein may be relatively cost-effective and easy to implement across a wide array of work machines, and may further be tailored to meet the geometry, configuration, or applicational requirements of each machine.

The LiDAR solutions disclosed herein may be applied to other vehicles as well, including but not limited to consumer motor vehicles, commercial road trucks, aircraft, watercraft, and yet others, and may be particularly useful toward those vehicles utilizing object detection programs through LiDAR systems. For example, the disclosed LiDAR system, angled bracket, blinder bracket, and/or software solution may be implemented on an autonomous, semiautonomous, or driver-assisted vehicle—for example a commercial sedan. For many of the same reasons listed above, the disclosed solutions may reduce the frequency of false positives, increase the accuracy and reliability of the vehicle's object detection program, improve ease of use, and enhance driver safety. The above embodiments may likewise be fairly cheap, flexible, and interoperable with a number of vehicle designs.

Finally, the methods and principles disclosed herein may find industrial applicability in object detection systems outside of LiDAR technology, such as but not limited to object detection systems reliant on radar technology, sonar technology, or ultrasound technology. In particular, the solutions disclosed herein may apply to depth mapping or object detection methodologies employing wave-propagated beams to measure distance, where said wave-propagated beams may be adversely affected by reflective and/or transparent surfaces present on the associated vehicle. For example, an automotive radar system may utilize an analogous angled bracket or blinder bracket design to reorient the radar's FOV or to purposefully obstruct a particular range of beam coordinates within the FOV. In the latter case, the blinder of the blinder bracket may be composed of a material and comprise a thickness known to obstruct radar waves in the range of frequencies emitted by the associated system. The automotive radar system may also implement the software methods disclosed to filter a range of beam coordinates within the radar FOV known to cause false object detection. With regard to sonar or ultrasound technologies, the purpose of the disclosed embodiments may be slightly altered to avoid false object detection stemming from materials exhibiting auditory reflectivity, as opposed to optical reflectivity. Likewise, the blinder of the blinder bracket may be composed of a material and/or comprise a structure known to obstruct audio waves instead of electromagnetic waves. Regardless, the features methods disclosed herein may provide similar results in reducing false object detections for depth-mapping methodologies beyond purely LiDAR systems.

Figure 10:
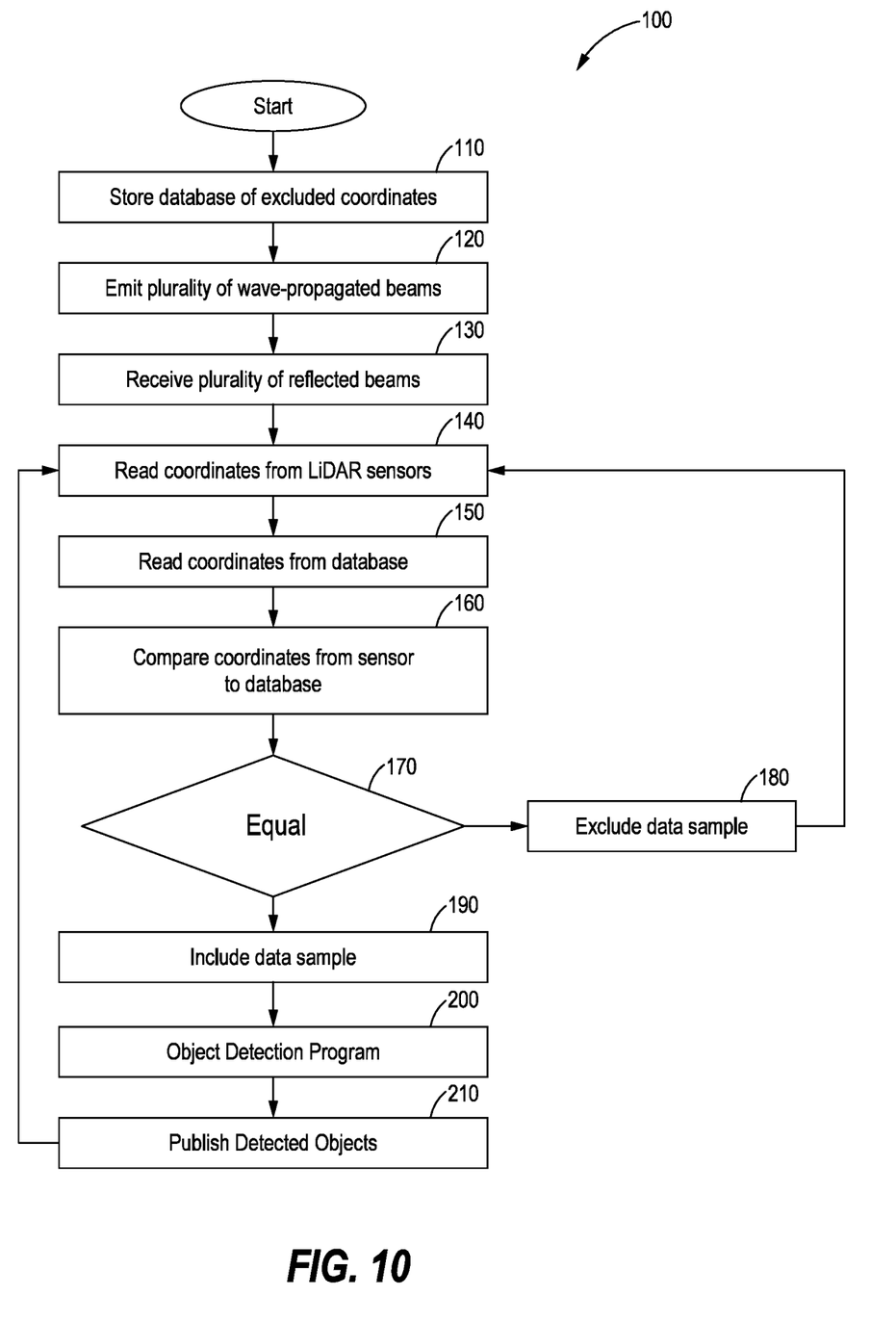
FIG. 10 is a flowchart depicting a method for reducing false object detections according to an embodiment of the present disclosure.

Turning now to FIG. 10, a method of reducing false object detection by an object detection system is generally referred to by a reference numeral 100. The method 100 may comprise first storing a database of excluded coordinates, each excluded coordinate being with respect to a field of view of the object detection system (110). Each excluded coordinate may include at least a yaw value and a pitch value, but other coordinate systems may also be considered and employed to similar effect, so long as it adheres to the same coordinate system employed by the object detection system. In block 120, a plurality of wave-propagated beams are emitted across the FOV, each emitted beam corresponding to a beam coordinate within the FOV. The object detection system may subsequently receive a plurality of reflected beams, where each reflected beam corresponds to an emitted beam and the same beam coordinate (130).

In the following steps, the object detection system may process a plurality of data samples, where each data sample corresponds to a beam coordinate and the wave-propagated beam transmitted at that coordinate. The data sample may, for example, correspond to a ToF for the wave-propagated beam to travel and return to the object detection system, or it may correspond to an analogous metric, such as the intensity of a correlated electrical signal. The object detection system is configured to filter and exclude from the object detection program those data samples with matching coordinates in the database.

In block 140, the object detection system may read a beam coordinate, and specifically a yaw value and a pitch value of the beam coordinate, associated with each data sample. Next, in block 150, the object detection system may read the excluded coordinates, and specifically a yaw value and a pitch value of each excluded coordinate, from the database. For each data sample, the beam coordinate is then compared with the excluded coordinates in the database (160). If the database includes the beam coordinate, the corresponding data sample is operatively excluded from the object detection program (180). Alternatively, if the database does not include the beam coordinate, the corresponding data sample is operatively included in the object detection program (190). In block 200, the object detection program is executed in consideration of the included data samples only, and the results of the program are published in block 210. In this manner, the beam coordinates or range of beam coordinates known to adversely affect the object detection program, such as those striking reflective surfaces of an associated vehicle, may be reliability excluded from said program.

In an embodiment, the database may instead store included coordinates, wherein the above filtering logic may be reversed. In this case, the data samples with beam coordinates matching those in the database may be included, and non-matching data samples excluded, in the subsequent object detection program.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A work machine comprising:
    a frame;
    a power unit supported by the frame;
    at least one locomotive device supporting the frame and driven by the power unit; and
    a LiDAR system configured to reduce false object detection, the LiDAR system including:
        at least one laser capable of emitting a plurality of laser beams across a FOV, each emitted beam corresponding to a beam coordinate within the FOV;
        at least one sensor capable of receiving a plurality of reflected beams, each reflected beam corresponding to an emitted beam;
        a bracket configured to house the at least one laser and the at least one sensor; and a control unit including a machine-readable storage medium and a processing unit, the control unit configured to execute an object detection program, and the LiDAR system configured to exclude from the object detection program a plurality of beams emitted toward the work machine, wherein the control unit runs a computer implemented method of reducing false object detection, the method including:
storing a database of excluded coordinates, each excluded coordinate being with respect to the FOV;
emitting the plurality of laser beams;
receiving the plurality of reflected beams;
filtering a plurality of data samples, each data sample corresponding to a beam coordinate, such that:
if the database includes the beam coordinate, excluding a data sample corresponding to the beam coordinate;
if the database does not include the beam coordinate, including a data sample corresponding to the beam coordinate; and
executing the object detection program using only the included data samples.

2. The work machine according to claim 1, wherein each beam coordinate includes a pitch value and a yaw value.

3. The work machine according to claim 1, the LiDAR system further including:
a left-facing LiDAR centered on a transverse axis of the work machine; and
a right-facing LiDAR centered on the transverse axis of the work machine.

4. The work machine according to claim 1, wherein the FOV includes 210° of yaw.

5. The work machine according to claim 3, wherein the bracket orients the FOV to be centered oblique from a transverse axis of the work machine.

6. The work machine according to claim 5, wherein the bracket orients the FOV to be centered oblique from the transverse axis by 7.5° of yaw.

7. The work machine according to claim 1, wherein the bracket further includes a blinder configured to obstruct a plurality of beams corresponding to a specific range of beam coordinates.

8. The work machine according to claim 7, wherein the blinder is configured to obstruct the plurality of beams emitted toward the work machine.

9. The work machine according to claim 1, wherein the work machine is a compactor and further comprises an implement selected from the group consisting of a sheepsfoot roller, a tamping roller, a vibratory roller, or a pneumatic roller.

10. A LiDAR system for use with a work machine configured to reduce false object detection comprising:
at least one laser capable of emitting a plurality of laser beams across a FOV, each emitted beam corresponding to a beam coordinate within the FOV;
at least one sensor capable of receiving a plurality of reflected beams, each reflected beam corresponding to an emitted beam; and
a control unit including a machine-readable storage medium and a processing unit, the control unit being configured to run a computer implemented method of reducing false object detection, the method including:
storing a database of excluded coordinates, each excluded coordinate being with respect to the FOV;
emitting the plurality of laser beams;
receiving the plurality of reflected beams;
filtering a plurality of data samples, each sample corresponding to a beam coordinate, such that:
if the database includes the beam coordinate, excluding a data sample corresponding to the beam coordinate;
if the database does not include the beam coordinate, including a data sample corresponding to the beam coordinate; and
executing an object detection program using only the included data samples.

11. The LiDAR system according to claim 10, wherein each beam coordinate and each excluded coordinate includes a pitch value and a yaw value.

12. The LiDAR system according to claim 10, further comprising:
a bracket configured to house the at least one laser and the at least one sensor, the bracket including a front plate and a back plate.

13. The LiDAR system according to claim 12, wherein the FOV is centered substantially perpendicular to the front plate; and wherein the back plate is substantially oblique to the front plate.

14. The LiDAR system according to claim 12, wherein the bracket further includes a blinder configured to obstruct a plurality of beams corresponding to a specific range of beam coordinates.

15. A method of reducing false object detection by an object detection system on a work machine comprising:
storing a database of excluded coordinates, each excluded coordinate being with respect to a FOV;
emitting a plurality of wave-propagated beams across the FOV, each emitted beam corresponding to a beam coordinate within the FOV;
receiving a plurality of reflected beams, each reflected beam corresponding to an emitted beam;
filtering a plurality of data samples, each data sample corresponding to a beam coordinate, by:
identifying whether the database includes the beam coordinate, excluding a data sample corresponding to the beam coordinate;
identifying whether the database does not include the beam coordinate, including a data sample corresponding to the beam coordinate; and
executing an object detection program using only the included data samples.

16. The method according to claim 15, wherein each beam coordinate and each excluded coordinate includes a pitch value and a yaw value.

17. The method according to claim 15, wherein the object detection system is a radar system and each wave-propagated beam is a radar beam.

18. The method according to claim 15, wherein the object detection system is a sonar system and each wave-propagated beam is a sonar beam.

19. The method according to claim 15, wherein the object detection system is a LiDAR system each wave-propagated beam is a laser beam.

* * * * *